(12) United States Patent
Ishiyama

(10) Patent No.: US 7,466,511 B2  
(45) Date of Patent: Dec. 16, 2008

(54) HAND MECHANISM IN A CARTRIDGE LIBRARY APPARATUS BEING ASSOCIATED WITH A BUFFER MECHANISM TO ALLOW THE HAND MECHANISM TO HOLD A CARTRIDGE EVEN WHEN THE HAND MECHANISM IS NOT POSITIONED AT AN OPTIMAL, NORMAL POSITION

(75) Inventor: Kazunori Ishiyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 355 days.

(21) Appl. No.: 11/175,227

(22) Filed: Jul. 7, 2005

(65) Prior Publication Data

US 2006/0221485 A1  Oct. 5, 2006

(30) Foreign Application Priority Data

Mar. 30, 2005  (JP)  ............................. 2005-098563

(51) Int. Cl.  
*G11B 15/68*  (2006.01)

(52) U.S. Cl. .................... 360/92; 369/30.43; 369/30.55

(58) Field of Classification Search ............. 369/30.43, 369/30.55, 30.44; 360/92  
See application file for complete search history.

(56) References Cited

U.S. PATENT DOCUMENTS 6,454,509 B1 *  9/2002  Kappel et al. ............... 414/280

6,717,766 B2  4/2004  Hashimoto et al.  
6,839,198 B2  1/2005  Shimanuki

FOREIGN PATENT DOCUMENTS

| JP | 09-167407 | 6/1997 |
|----|-----------|--------|
| JP | 2003-59143 | 2/2003 |
| JP | 2003-157599 | 5/2003 |

* cited by examiner

*Primary Examiner*—A. J. Heinz  
(74) *Attorney, Agent, or Firm*—Staas & Halsey LLP

(57) ABSTRACT

A library apparatus comprises a plurality of cartridges each containing a recording medium, a storage rack in which the plurality of cartridges is stored, at least one drive that records or reproduces data in or from the cartridge, and an accessor that holds the cartridge and transports the cartridge between the storage rack and the drive. Herein, a hand mechanism included in the accessor includes a buffer mechanism that, even if the advancement of the hand mechanism is stopped with the hand mechanism abutted against the cartridge within a predetermined range before reaching a normal position, allows the hand mechanism to hold the cartridge. The buffer mechanism is incorporated in a rotary base included in a crank mechanism. When external force is applied to a crank arm, the buffer mechanism moves a rotary shaft of the crank arm. Consequently, even if the hand mechanism approaches the cartridge storage rack too closely, the hand mechanism can access the cartridge without the necessity of retrying the advancement.

23 Claims, 10 Drawing Sheets

HAND MECHANISM IN A CARTRIDGE LIBRARY APPARATUS BEING ASSOCIATED WITH A BUFFER MECHANISM TO ALLOW THE HAND MECHANISM TO HOLD A CARTRIDGE EVEN WHEN THE HAND MECHANISM IS NOT POSITIONED AT AN OPTIMAL, NORMAL POSITION

CROSS-REFERENCE TO RELATED APPLICATION

This application claims priority from, and incorporates by reference the entire disclosure of, Japanese Patent Application No. 2005-98563 filed on Mar. 30, 2005.

BACKGROUND OF THE INVENTION

1. Field of the Invention

The present invention relates to a library apparatus and a hand mechanism included in the library apparatus. More particularly, the present invention is concerned with a library apparatus that has numerous cartridge-type recording media stored in a rack formed in the apparatus, and that records or reproduces data in or from a selected desired recording medium, and a hand mechanism included in an accessor employed in the library apparatus.

2. Description of the Related Art

Along with an increase in an amount of information to be handled in a computer system, a library apparatus adopting a cartridge-type storage medium (hereinafter, simply, a cartridge) that contains magnetic tape has come to be known as an information storage device in which a large amount of information is stored. The library apparatus comprises a plurality of shelves in which numerous cartridges are stored, an access unit that inserts or ejects a cartridge, a drive unit that records or reproduces data in or from a recording medium contained in a cartridge, and an accessor robot (hereinafter, simply, an accessor) that transports a cartridge between the cartridge storage rack and the drive unit.

In recent years, along with sophistication of computer systems, improvement in the reliability of electronic equipment forming a computer system has been required. Moreover, for market competitiveness, the library apparatus must be low cost, be compact, and offer a large storage capacity. It is therefore a must to realize a low-cost, compact, and large-capacity reliable library apparatus and, for example, a large-capacity library apparatus in which several hundreds of cartridges can be stored and about twenty drive units are included.

Moreover, in the large-capacity library apparatus, a hand mechanism that loads or unloads a cartridge in or from a cartridge storage rack plays a pivotal role. A conventional hand mechanism uses a plurality of different motors for different purposes of moving fingers, which hold a cartridge, back and forth (movement for loading or unloading a cartridge), and of causing the finger to hold a cartridge. Thus, the back-and-forth movement and holding movement are controlled mutually independently.

However, since the conventional hand mechanism uses the plurality of motors, the hand mechanism causes a library apparatus to be large in size. Moreover, the increase in the number of motors leads to an increase in a cost and makes it hard to increase the number of cartridges incorporated.

Consequently, a library apparatus having the structure of a hand mechanism thereof made simpler and less expensive has been proposed in Japanese Unexamined Patent Application Publication No. 2003-59143 (FIG. 7 and its description).

Herein, the hand mechanism comprises fingers that hold a cartridge, a link mechanism that causes the fingers to hold the cartridge, and a crank mechanism that reciprocates the finger and the link mechanism and drives the link mechanism. The crank mechanism is driven by one motor.

However, although the hand mechanism described in the Japanese Unexamined Patent Application Publication No. 2003-59143 has the features that the structure is simple and compact and the number of motors is small, the hand mechanism suffers a drawback that there is difficulty in adapting the hand mechanism to a large magnetic tape library apparatus. The drawback will be explained in more detail. The size of the library apparatus described in the Japanese Unexamined Patent Application Publication No. 2003-59143 is small, so that the distance moved by an accessor is short. Accordingly, a positional error of the accessor, which increases according to the distance, is small. The apparatus can absorb such a small positional error. However, when the library apparatus is large in size, the distance moved by the accessor increases. Therefore, if the precision in assembling the components of an apparatus or the precision in the dimensions of the components is low, and the accessor is inaccurately positioned in a storage rack in which a cartridge, which the accessor is about to access, is stored.

For example, when the accessor approaches a cartridge storage rack too closely, the fingers included in the hand mechanism fail to advance halfway and fail to reach a normal position. This prevents a crank arm included in the crank mechanism from rotating. Consequently, the link mechanism is not driven, and the fingers attached to the link mechanism cannot hold a cartridge. At worst, the hand mechanism is broken and the cartridge is damaged.

SUMMARY OF THE INVENTION

Accordingly, an object of the present invention is to provide a highly reliable library apparatus and a hand mechanism employed in the library apparatus. Herein, after an accessor is moved, when a hand mechanism having fingers thereof moved by a crank mechanism and a link mechanism accesses a cartridge, even if the hand mechanism is positioned to lie closer to the cartridge than it does at a normal position, the rotation of a crank arm included in the crank mechanism can be continued. Consequently, the hand mechanism can access the cartridge without the necessity of retrying the positioning.

A library apparatus in accordance with the present invention that accomplishes the above object comprises a plurality of cartridges each containing a storage medium, a storage rack in which the plurality of cartridges is stored, at least one drive that records or reproduces data in or from the cartridge, and an accessor that holds the cartridge and transports it between the storage rack and drive. The accessor includes a hand mechanism that advances, holds or releases a cartridge, or withdraws. The hand mechanism includes a buffer mechanism that even when the advancement of the hand mechanism is stopped with the hand mechanism abutted against the cartridge within a predetermined range before reaching a normal position, allows the hand mechanism to hold a cartridge.

When the hand mechanism included in the library apparatus comprises fingers that hold a cartridge, a link mechanism that causes the fingers to hold the cartridge, and a crank mechanism that reciprocates the fingers and the link mechanism and drives the fingers, the buffer mechanism may be incorporated in the crank mechanism.

Moreover, when a rotary shaft of a crank arm included in the crank mechanism included in the hand mechanism is driven to rotate by a rotary base accommodating the rotary shaft, the buffer mechanism may be interposed between the rotary shaft and rotary base.

In this case, the buffer mechanism comprises a buffer block coupled to the rotary shaft, slide shafts that allow the buffer block to move within the rotary base, and compression springs wound about the slide shafts. When the buffer mechanism has these components, the rotary shaft is located in the center of the rotary base in a normal state owing to the constraining force exerted by the compression springs. When the advancement of the hand mechanism is stopped with the hand mechanism abutted against the cartridge within the predetermined range before reaching the normal position, the rotary shaft moves in a direction opposite to the direction of the crank arm due to contraction of the compression springs. Consequently, the crank arm keeps rotating, and the link mechanism is normally driven.

A hand mechanism employed in a library apparatus in accordance with the present invention that accomplishes the above object and that comprises a plurality of cartridges each containing a recording medium, a storage rack in which the plurality of cartridges is stored, at least one drive which records or reproduces data in or from a cartridge, and an accessor which holds the cartridge and transports it between the storage rack and drive is included in the accessor. The hand mechanism comprises fingers that hold a cartridge, a link mechanism that causes the fingers to hold the cartridge, and a crank mechanism that reciprocates the fingers and link mechanism and drives the link mechanism. The crank mechanism includes a buffer mechanism that, even when the rotation of the crank mechanism is stopped halfway, allows the crank mechanism to continue the rotation.

According to the library apparatus in which the present invention is implemented, after the accessor is moved, when the hand mechanism included in the accessor accesses the cartridge, even if the hand mechanism is positioned to lie closer to the cartridge than it does at a normal position, the rotation of the crank arm included in the crank mechanism can be continued. The hand mechanism can therefore access the cartridge without the necessity of retrying the positioning. This has the advantage of high reliability in the library apparatus.

Moreover, according to the hand mechanism in which the present invention is implemented, when the fingers are moved by the crank mechanism and the link mechanism in order to hold the cartridge, even if the hand mechanism approaches the cartridge more closely than it does at the normal position, as long as the hand mechanism lies within the predetermined range, the hand mechanism can hold the cartridge.

BRIEF DESCRIPTION OF THE DRAWINGS

The present invention will be more clearly understood from the description as set forth below with reference to the accompanying drawings, wherein.

DESCRIPTION OF THE PREFERRED EMBODIMENTS

Figure 1A:
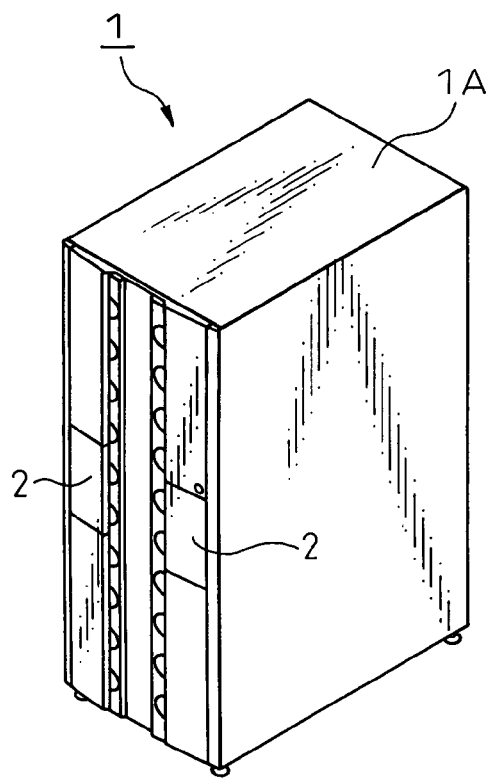
FIG. 1A is a perspective view showing the appearance of an embodiment of a library apparatus in accordance with the present invention.

Referring to the drawings, a preferred embodiment of the present invention will be described below. A description will be made with the same reference numerals assigned to identical components.

Figure 1B:
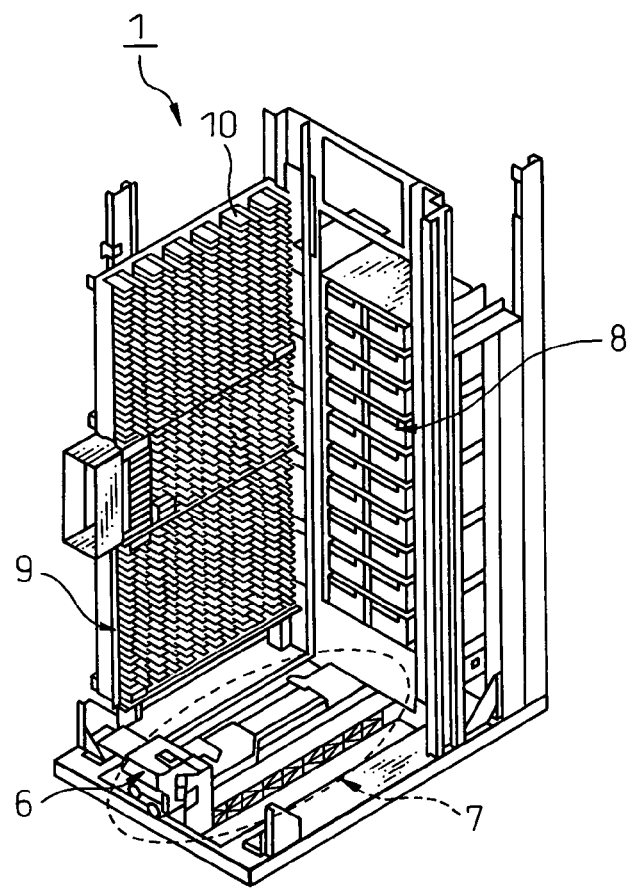
FIG. 1B is a perspective view showing the internal construction with the cover of the library apparatus shown in FIG. 1A removed.

FIG. 1A is a front view of a library apparatus 1 in accordance with the first embodiment of the present invention. FIG. 1B shows the library apparatus with a cover 1A removed. Two medium access ports 2 through which a cartridge containing magnetic tape is loaded or unloaded in or from the library apparatus 1 are formed in the front panel of the library apparatus 1. The library apparatus 1 of the present embodiment has the two medium access ports 2 located at different positions. A cartridge can be loaded or unloaded in or from the library apparatus 1 through each of the medium access ports 2.

As shown in FIG. 1B, drives 8, that are recording/reproducing devices, each of which records or reproduces data in or from a cartridge 10, and a cartridge storage rack 9 in which a plurality of cartridges 10 can be stored are incorporated in the library apparatus 1. In this drawing, only one cartridge storage rack 9 is shown. The cartridge storage rack 9 may be formed at a position corresponding to the position of the right-hand medium access port 2 shown in FIG. 1A.

Furthermore, an accessor 7 that is a robot for transporting the cartridge 10 between any of the drives 8 and cartridge storage rack 9 is incorporated in the library apparatus 1. The accessor 7 includes a hand mechanism 6 that fetches or inserts the cartridge 10 from or into the cartridge storage rack 9. The hand mechanism 6 can move back and forth, right and left, and up and down within the library apparatus 1.

The library apparatus 1 is connected to a computer, a server, or a personal computer over a network. When the library apparatus 1 is accessed by the computer, server, or personal computer, the library apparatus 1 records information in the cartridge 10 or reproduces data from the cartridge 10. Therefore, numerous cartridges 10 are stored in the cartridge storage rack in the library apparatus 1. The library apparatus 1 of the present embodiment is a large-size apparatus capable of accommodating up to twenty drives 8 and up to seven hundred shelves included in the cartridge storage rack 9. Furthermore, when addition or exchange of the cartridge 10 is required, the addition or exchange can be achieved through the medium access ports 2.

Figure 2A:
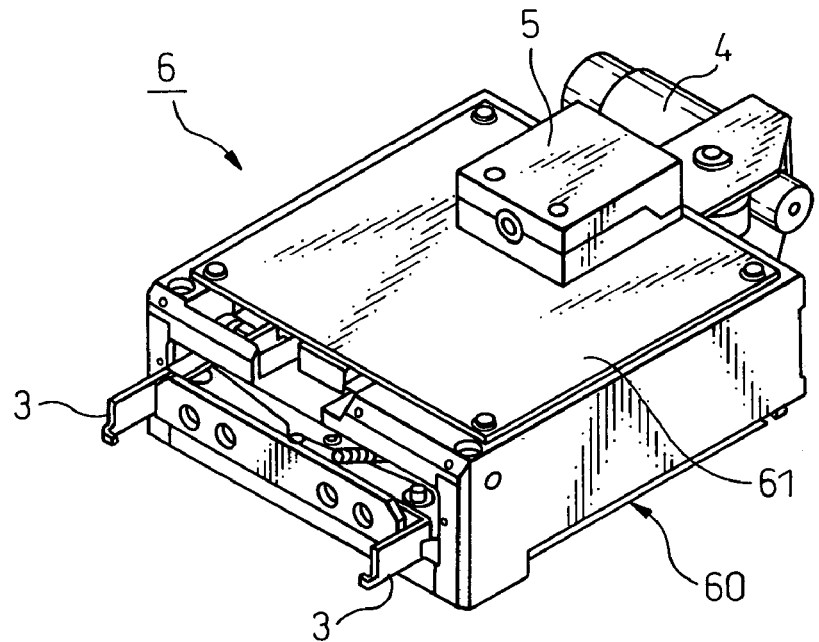
FIG. 2A is a perspective view showing the appearance of an embodiment of a hand mechanism incorporated in a library apparatus.

FIG. 2A shows the appearance of an embodiment of the hand mechanism 6 incorporated in the library apparatus 1. The hand mechanism 6 is located at a desired position in front of the cartridge storage rack 9 by means of the accessor 7 shown in FIG. 1B. At the position, the hand mechanism 6 thrusts fingers 3 from a housing 60 so as to hold the cartridge 10, and fetches the held cartridge 10 into the housing 60. Thrusting or sinking of the fingers 3 from or into the housing 60 and holding the cartridge 10 with the fingers 3 are enabled by a motor 4 attached to the back of the housing 60. Moreover, a bar code reader 5 mounted on the top of the housing 60 reads a bar code printed on the cartridge 10 as mentioned later. The hand mechanism 6 into which the cartridge 10 is fetched is moved to a different place by the accessor.

Figure 2B:
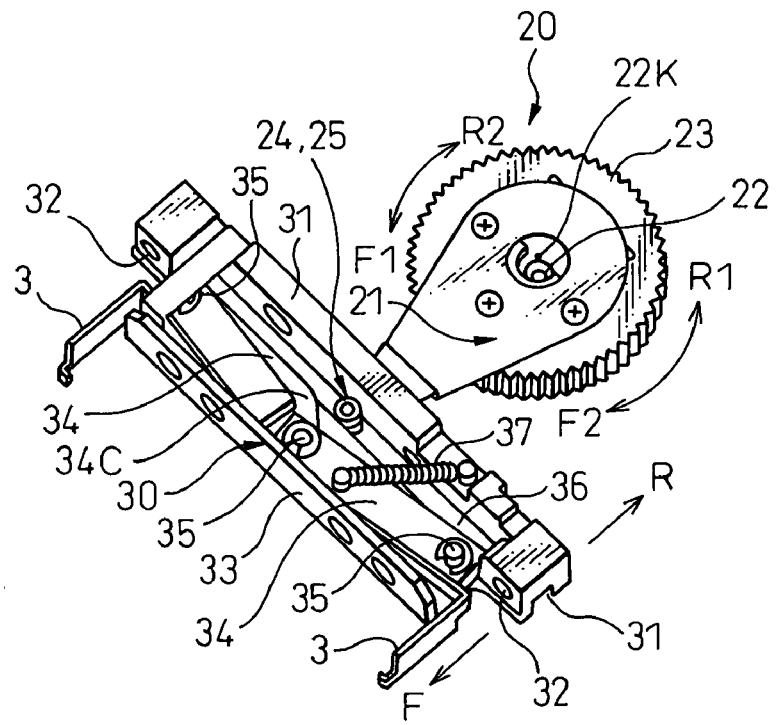
FIG. 2B is a perspective view showing the constructions of a crank mechanism and a link mechanism included in the hand mechanism shown in FIG. 2A.

FIG. 2B shows the constructions of a crank mechanism 20 and a link mechanism 30 included in the hand mechanism 6 with a cover 61 of the hand mechanism 6 shown in FIG. 2A removed. The crank mechanism 20 and link mechanism 30 located at the same positions as those shown in FIG. 2B are shown together with the other components in FIG. 3C. The crank mechanism 20 that moves the fingers 3 while lying within the hand mechanism 6, and the link mechanism 30 that moves within the housing 60 of the hand mechanism 6 owing to the crank mechanism 20 and allows the fingers 3 to hold a cartridge are incorporated in the hand mechanism 6.

The crank mechanism 20 comprises a crank arm 21, a rotary base 23, a crank pin 24, and a roller 25. The crank arm 21 is attached to the rotary base 23 having a gear threaded on the periphery thereof. The rotary base 23 is driven to rotate by the motor 4. The rotation of the rotary base 23 causes the crank arm 21 to rotate with a rotary shaft 22 as a center. The roller 25 is supported by the crank pin 24 attached to the distal end of the crank arm 21 so that the roller 25 can freely revolve on the crank pin 24. The crank pin 24 and the roller 25 are engaged with the link mechanism 30.

Two slide rails 62 are laid down on the floor surface 63 of the housing 60 of the hand mechanism so that they will extend parallel to each other near both sides of the floor surface 63. The link mechanism 30 is moved within the housing 60 while being guided by the slide rails 62. To be more specific, the link mechanism 30 comprises a base 31, through holes 32, an abutment plate 33, two link rods 34, pins 35, a guide groove 36, and a tension spring 37. The slide rails 6 shown in FIG. 3C are passed through the through holes 32 bored at both ends of the base 31. The abutment plate 33 serves as the face of the link mechanism 30. One end of each of the two link rods 34 is supported by the pins 35 on the base 31, and the other end of each of the two link rods is joined by the pin 35. The space between the two link rods 34 joined by the pin 35 and the base 31 is the guide groove 36. The roller 25 loosely engaged with the crank pin 24 included in the crank mechanism 20 is inserted in the guide groove 36.

The fingers 3 are attached to both the ends of the link rods 34 that are joined by the pin 35. The tension spring 37 is laid over between one of the link rods 34 and the base 31. Owing to the tension spring 37, the link rods 34 are pulled toward the base 31. Consequently, the link rods 34 are constrained to move in a direction permitting the fingers 3 to close. One of the link rods 34 projects to the guide groove 36 in a smooth curve. The projecting portion of the link rod serves as a cam portion 34C.

The crank mechanism 20 and link mechanism 30 are joined as shown in FIG. 2B. As the crank pin 24 and roller 25 attached to the distal end of the crank arm 21 are inserted into the guide groove 36 included in the link mechanism 30, the link mechanism 30 moves in a direction of arrow F or a direction of arrow R along with the rotation of the rotary base 23. In the present embodiment, although the center of rotation of the crank arm 21 lies on the bottom of the rotary base 23, the crank arm 21 has a virtual rotary shaft 22K.

When the rotary base 23 starts rotating in a direction of arrow F1 with the crank pin 24 and roller 25, which are attached to the crank arm 21, located in the inmost part of the hand mechanism 6, the hand mechanism 6 is about to hold a cartridge. In this case, as the link mechanism 30 approaches the cartridge, the roller 25 rides on the cam portion 34C of the link rod 34. At this time, the link mechanism 30 is thrust forward by the roller 25 to move a distance equivalent to the size of the projecting portion that is the cam portion 34C. Consequently, the extra movement causes the fingers 3 attached to the link mechanism 30 to open. As the roller 25 overpasses the cam portion 34C of the link rod 34, the link mechanism 30 is restored to the original state due to the tension of the tension spring 37. This causes the fingers 3 attached to the link mechanism 30 to close. Owing to the opening and closing of the fingers 3, a cartridge is held by the fingers 3.

As the rotary base 23 included in the crank arm 21 causing the link mechanism to hold a cartridge keeps rotating in a direction of arrow R1, the link mechanism 30 holding the cartridge moves in the direction of arrow R, and brings the cartridge to the inmost part of the hand mechanism. Accordingly, when the cartridge is locked in the hand mechanism, the hand mechanism is moved to a different place, where the cartridge is handed over, by the accessor. For example, the hand mechanism is moved to a place in front of a drive or a place in front of the other cartridge storage rack in which the cartridge is to be stored.

When the hand mechanism is positioned to a place where a cartridge is handed over, the rotary base 23 rotates in a direction of arrow F2. The link mechanism 30 holding the cartridge moves in the direction of arrow F. After the roller 25 is moved to a position farthest from the inmost part of the hand mechanism 6, the rotary base 23 still keeps rotating in the direction of arrow R2. Accordingly, the roller 25 rides on the cam portion 34C of the link rod 34. This causes the fingers 3 attached to the link mechanism 30 to open. Thereafter, the link mechanism 30 moves to the inmost part of the hand mechanism 6 along with the rotation of the rotary base 23 in the direction of arrow R2. However, as the fingers 3 are open, the link mechanism 30 moves with the cartridge left behind. When the roller 25 overpasses the cam portion 34C of the link rod 34, the fingers 3 are closed. At this time, the fingers 3 are located away from the position at which the fingers 3 can hold the cartridge. Owing to the opening and closing of the fingers, the link mechanism 30 returns to the inmost part of the hand mechanism 6 with the cartridge left behind.

Figure 3A:
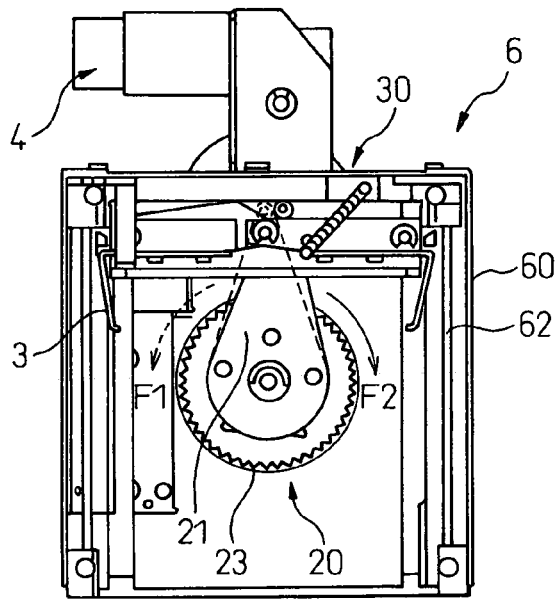
FIG. 3A to FIG. 3D are plan views showing movements made by the link mechanism along with the rotation of the crank mechanism shown in FIG. 2B.
Figure 3B:
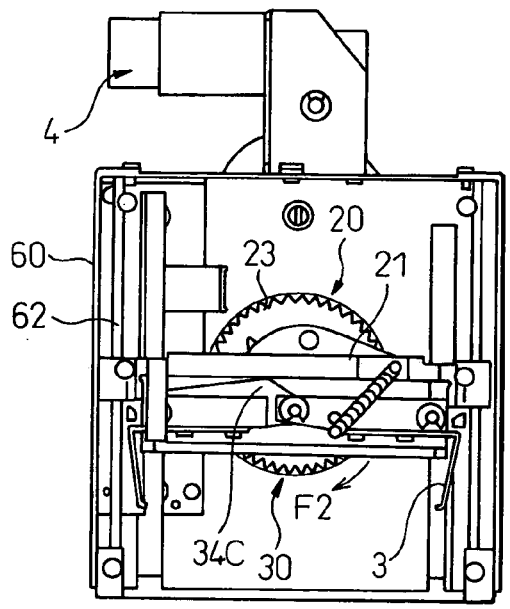
Figure 3C:
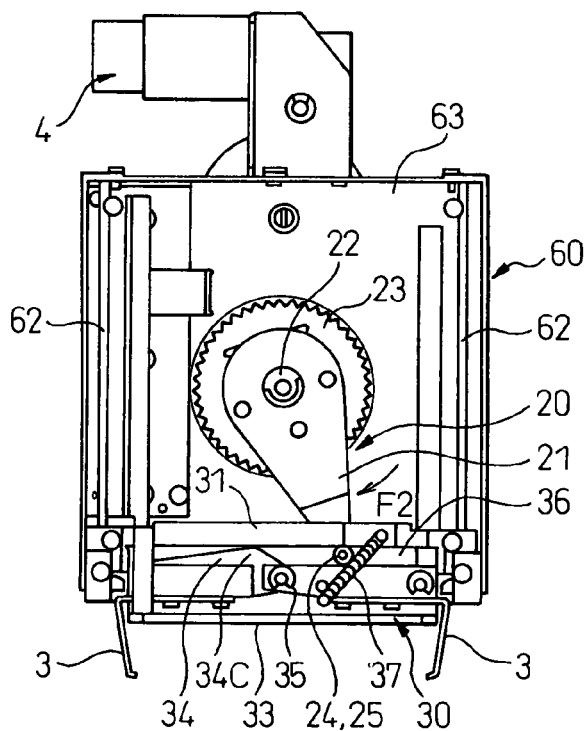
Figure 3D:
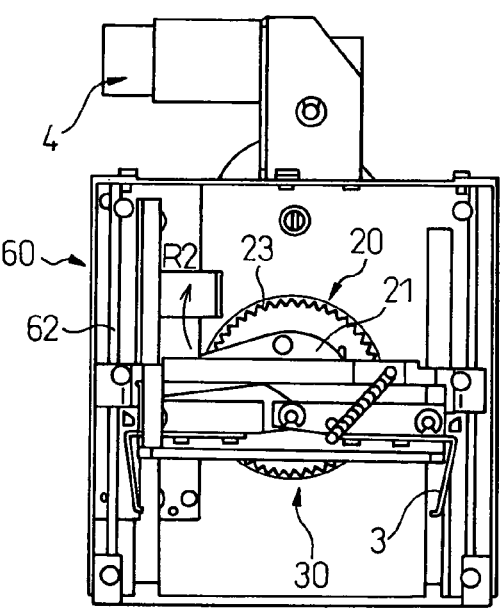

FIG. 3A shows a state in which the crank arm 21 included in the crank mechanism 20 shown in FIG. 2B is rotated in the direction of arrow R1 to the greatest extent. In other words, a cartridge is held and fetched into the inmost part of the hand mechanism, though the cartridge is not shown. When the crank arm 21 is rotated in the direction of arrow F2 from the position thereof shown in FIG. 3A, the state shown in FIG. 3A is changed into a state shown in FIG. 3C via a state shown in FIG. 3B. When the crank arm 21 is further rotated with the hand mechanism in the state shown in FIG. 3C, the state shown in FIG. 3C is changed into a state indicated with a dashed line in FIG. 3A via the state shown in FIG. 3D. Namely, the crank arm 21 included in the present embodiment reciprocates over about 360°.

Figure 4A:
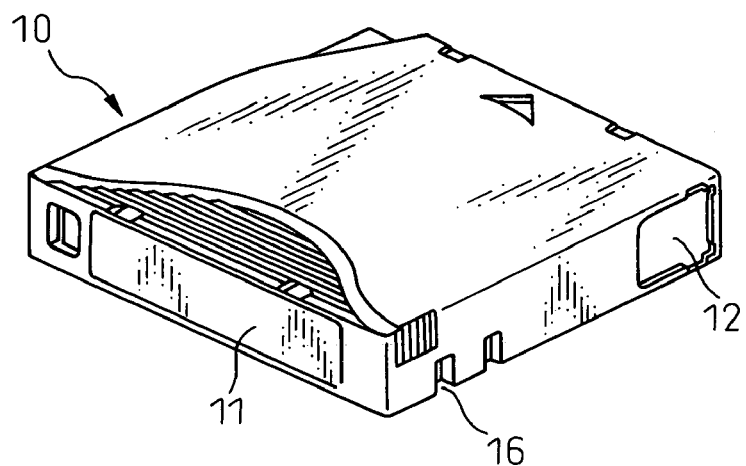
FIG. 4A is a perspective view showing an example of a magnetic tape cartridge incorporated in the library apparatus in accordance with the present invention.
Figure 4B:
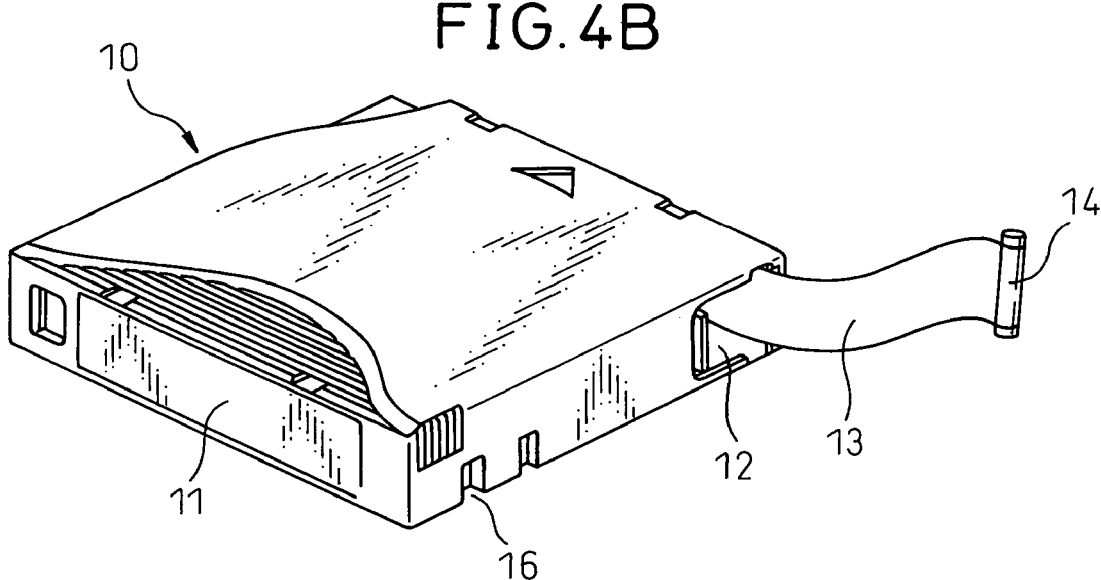
FIG. 4B is a perspective view showing the magnetic tape cartridge with magnetic tape pulled out of the magnetic tape cartridge shown in FIG. 4A.
Figure 4C:
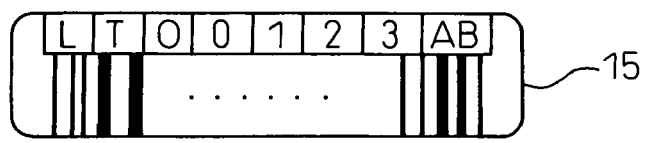
FIG. 4C shows an example of a bar code label on which a bar code is printed and which is bonded to a flank of the magnetic tape cartridge shown in FIG. 4A and FIG. 4B.

FIG. 4A shows an example of the magnetic tape cartridge 10 incorporated in the library apparatus 1 in accordance with the present invention. An identification label bonding field 11 and a magnetic tape pull port 12 are formed on or in the flanks of the cartridge 10. When the cartridge 10 is inserted into the drive 8 shown in FIG. 1B, the magnetic tape 13 is pulled out through the pull port 12 while being guided by a leader pin 14. A bar code label 15 having a bar code printed as an identifier thereon as shown in FIG. 4C is bonded to the identification label bonding field 11 of the cartridge 10. When the bar code printed on the bar code label 15 is read by the bar code reader 5 shown in FIG. 2A, the number and contents of the reel contained in each cartridge 10 can be detected. Furthermore, the cartridge 10 has a concave part (not shown), which is used to identify a medium, formed in the face thereof. Concave parts 16 into which the fingers of the hand mechanism are fitted are formed in the flanks of the cartridge 10 near the back thereof.

As the label to be bonded to the identification label bonding field 11, aside from the bar code label 15 having a bar code printed thereon, a label having a two-dimensional bar code printed thereon or a label having a mark or a symbol printed thereon may be adopted. Moreover, the cartridge 10 shown in FIG. 4A to FIG. 4C is what is referred to as an LTO medium that is one of types of cartridges employed in the library apparatus 1. The outer dimensions of the cartridge 10 are such that the width thereof is 105.4 mm, the depth thereof is 102 mm, and the height thereof is 21.5 mm. As a cartridge 10, aside from the LTO medium, a DLT medium can be adopted.

Figure 5:
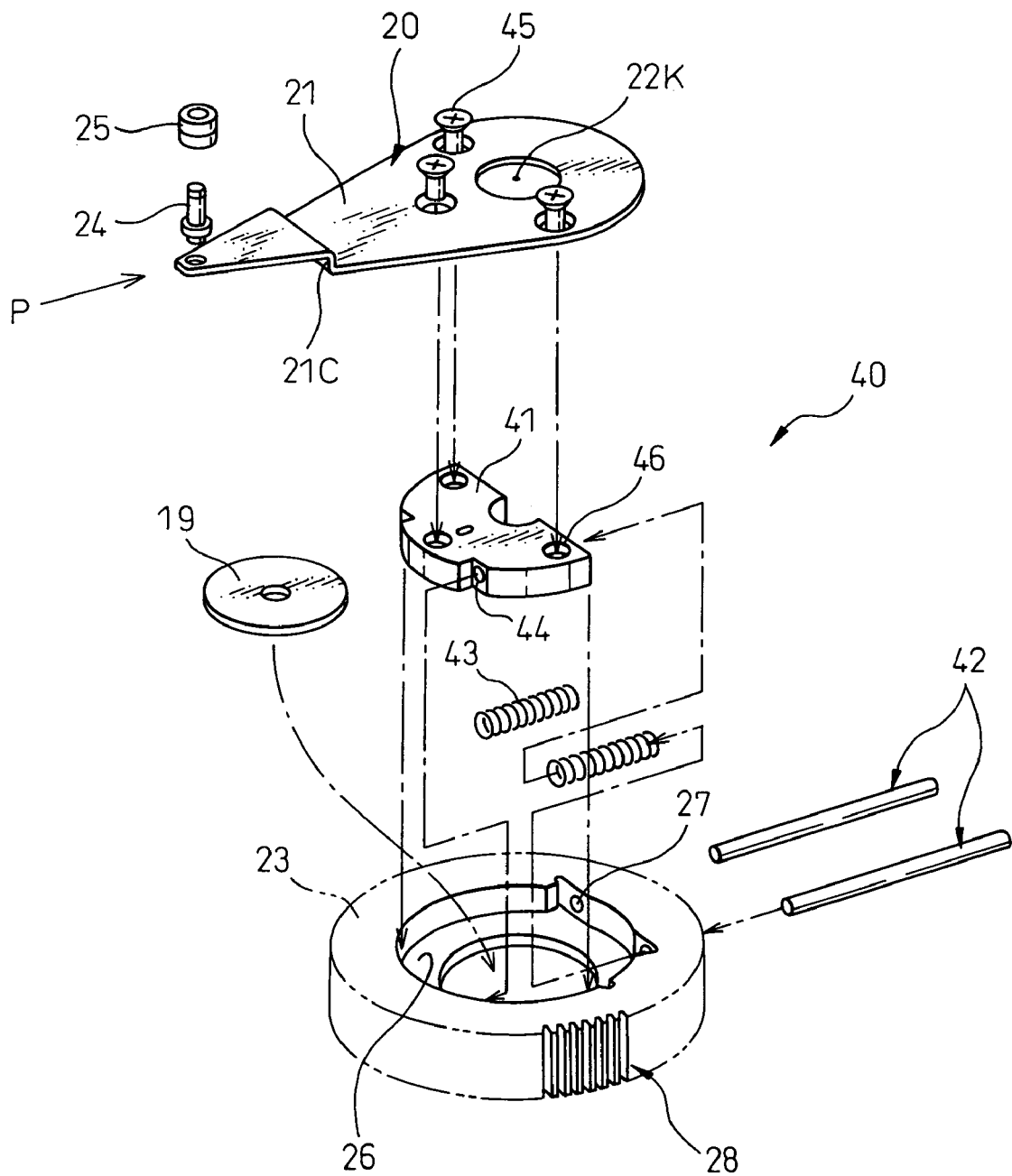
FIG. 5 is a perspective assembling diagram showing an example of a buffer mechanism incorporated in the hand mechanism included in the library apparatus in accordance with the present invention.

FIG. 5 is a perspective assembling diagram showing an example of the buffer mechanism 40 incorporated in the hand mechanism 6 included in the library apparatus 1 of the present invention. The buffer mechanism 40 of this example is incorporated in the rotary base 23 of the crank mechanism 20. The rotary base 23 is shaped like a disk having a predetermined thickness, and has the gear 28, which is driven by the motor 4 shown in FIG. 2B, threaded on the periphery thereof. In the past, the rotary base 23 has been solid and has had the crank arm 21 fixed directly to the top thereof. On the other hand, the rotary base 23 included in the present embodiment has a concave part 26 formed like a circle concentric with a circle linking the tips of teeth of the gear 28. The buffer mechanism 40 is formed in the concave part 26.

The buffer mechanism 40 comprises a buffer block 41, slide shafts 42, and compression springs 43. Through holes 27 through which the concave part 26 communicates with outside are bored in the rotary base 23 in order to pass the slide shafts 42 through the through holes 27. Retention holes used to retain the ends of the slide shafts are formed in the internal surface of the concave part 26 of the rotary base 23 opposite to the side of the internal surface having the openings of the through holes 27. The buffer block 41 is a semicircular member whose thickness is equivalent to the depth of the concave part 26 formed in the rotary base 23. Through holes 44 through which the slide shafts 42 pass are bored parallel to each other in a portion of the buffer block 42 between a surface of the buffer block 42 equivalent to a bowstring and a surface thereof equivalent to an arc. Three screw holes 46 used to attach the crank arm 21 are formed in the top of the buffer block 41.

Figure 6A:
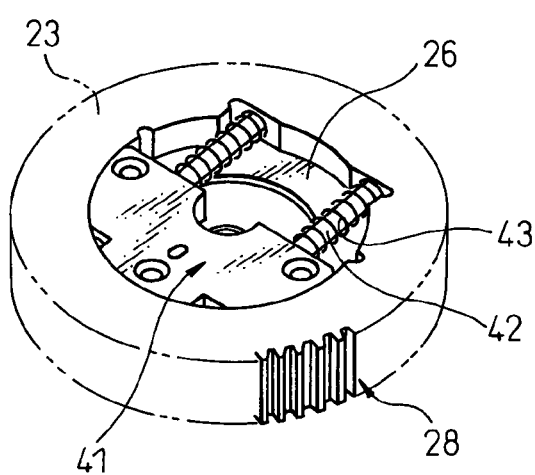
FIG. 6A is a perspective view showing the buffer mechanism shown in FIG. 5 in a normal state.
Figure 6B:
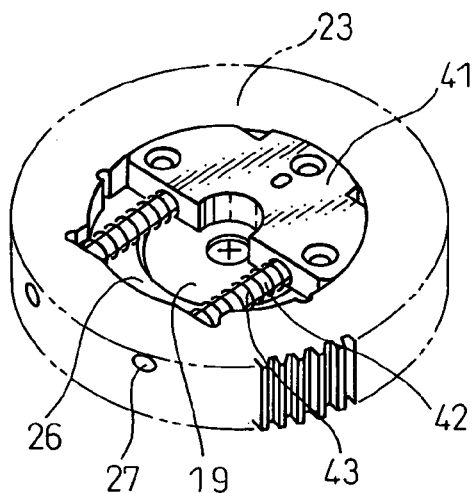
FIG. 6B is a perspective view showing the buffer mechanism shown in FIG. 6A from the opposite side thereof.

When the buffer mechanism 40 is constructed, the arc portion of the buffer block 41 is inserted into the concave part 26 along the internal surface of the concave part 26 of the rotary base 23. At this time, the position of the buffer block 41 in the concave part 26 is adjusted so that the through holes 44 bored in the buffer block 41 will be aligned with the extensions of the through holes 27 bored in the rotary base 23. The compression springs 43 are inserted into the concave part 26 so that both the ends of the compression springs 43 will be located at the positions of the openings of the two pairs of through holes 27 and 44. In this state, the slide shafts 42 are passed through the through holes 27, compression springs 43, and through holes 44 in that order, and then inserted into the retention holes (not shown). A state in which the buffer block 41 is thus locked in the concave part 26 is a state shown in FIG. 6A. FIG. 6B shows the state shown in FIG. 6A from the opposite side of the rotary base.

Referring back to FIG. 5, after the buffer mechanism 40 is constructed as mentioned above, the crank arm 21 is attached to the buffer block 41 using screws 45. The distal part of the crank arm 21 has a step 21C, and the crank pin 24 is fixed to the tip of the distal part beyond the step 21C. The roller 25 is engaged with the crank pin 24 so that the roller 25 can freely revolve on the crank pin 24. As a hole is formed in the proximal part of the crank arm 21, the center of the hole is regarded as the virtual rotary shaft 22K of the crank arm 21. A spacer 19 is interposed between the buffer block 41 and concave part 26, and secured as a member, which locks the concave part 26 in the housing 60, using screws different from the screws 45 shown in FIG. 5 (see FIG. 6B).

Figure 6C:
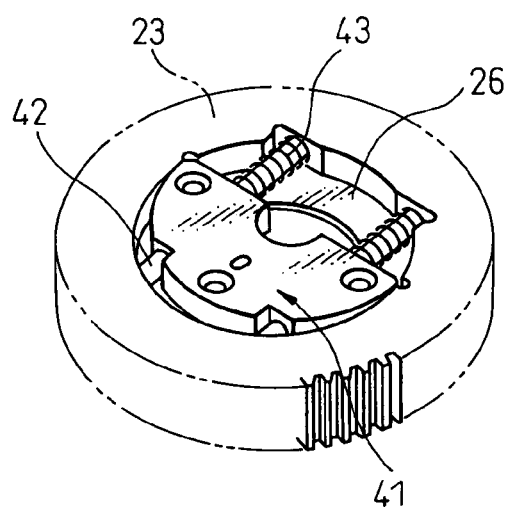
FIG. 6C is a perspective view showing the buffer mechanism that is shown in FIG. 6A and that is in motion.
Figure 6D:
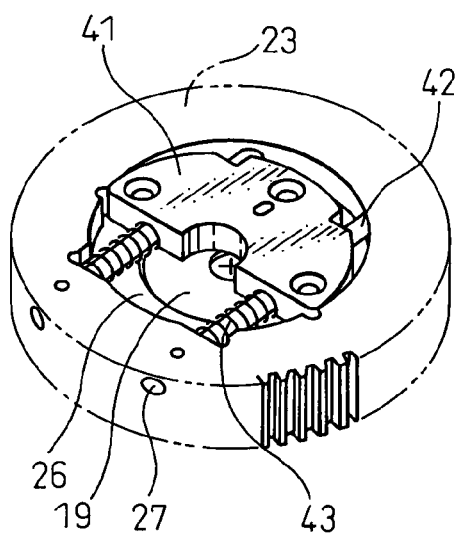
FIG. 6D is a perspective view showing the buffer mechanism that is shown in FIG. 6B and that is in motion.

When an external force indicated with an arrow P is applied to the crank arm 21, the buffer block 41 that is included in the buffer mechanism 40 having the foregoing components and that is coupled to the crank arm 21 moves, as shown in FIG. 6C, along the slide shafts 42 while the compression springs 43 contract. FIG. 6D shows the state shown in FIG. 6C from the opposite side of the rotary base. Consequently, the rotary shaft (virtual rotary shaft 22K) of the crank arm 21 attached to the buffer block 41 is displaced along with the movement of the buffer block 41.

Figure 7A:
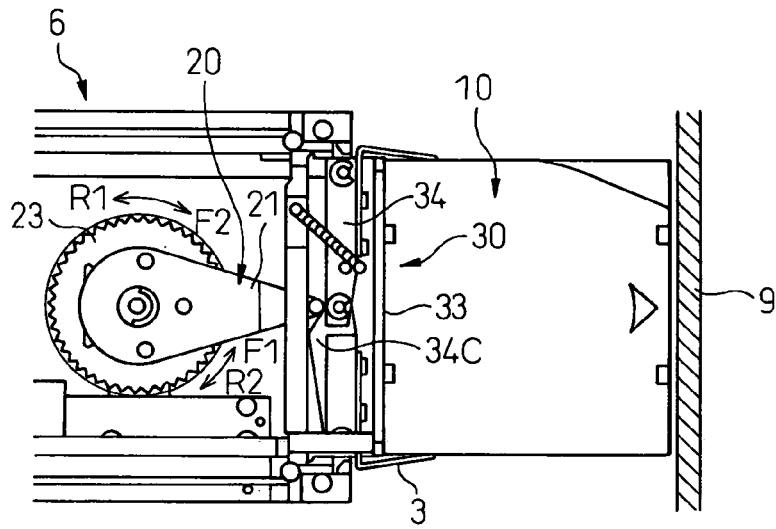
FIG. 7A shows the hand mechanism moved to a normal position relative to a cartridge, which the hand mechanism is about to hold, by means of an accessor.

FIG. 7A shows a state in which the hand mechanism 6 is moved to a normal position relative to the cartridge storage rack 9 by means of the accessor 7 in order to return the held cartridge 10 to the cartridge storage rack 9. In this state, the crank arm 21 rotates normally due to the rotation of the rotary base 23, and can reach a maximum rotational position. Thereafter, the crank arm 21 of the crank mechanism 20 further rotates in the direction of arrow R2, and overpasses the cam portion 34C of the link rod 34. The link mechanism 30 therefore works normally. The fingers 3 open to leave the cartridge 10 behind. The link mechanism 30 then returns to the hand mechanism 6.

Figure 7B:
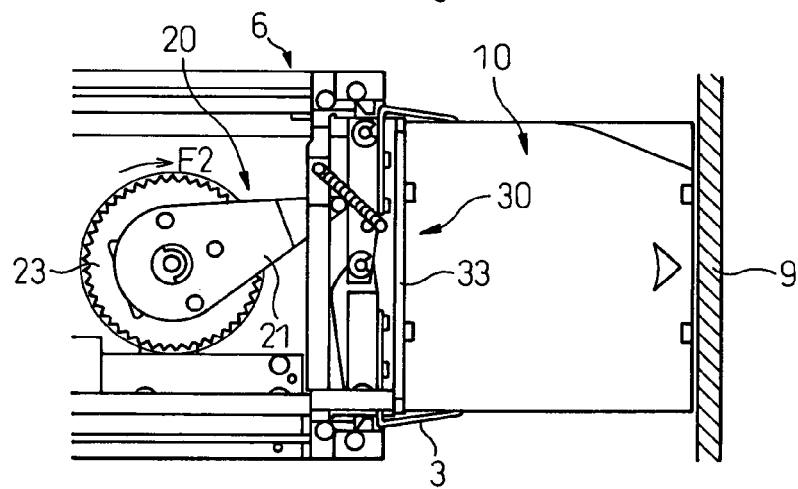
FIG. 7B shows an abnormal state in which the hand mechanism moved to a position, at which the hand mechanism too closely approaches a cartridge which the hand mechanism is about to hold, by means of the accessor.

FIG. 7B shows an abnormal state in which the hand mechanism 6 too closely approaches the cartridge storage rack 9, in which the cartridge 10 to be returned is stored, by means of the accessor 7 shown in FIG. 1B. In this state, when the crank arm 21 rotates due to the rotation of the rotary base 23, as the hand mechanism 6 is too close to the cartridge storage rack 9, the rotation of the crank arm 21 is stopped before the crank arm 21 reaches the maximum rotational position.

As far as the conventional hand mechanism 6 is concerned, as the crank arm 21 is fixed to the rotary base 23 as mentioned previously, the crank arm 21 cannot rotate any move. Consequently, when the hand mechanism 6 approaches the cartridge storage rack 9 too closely, the crank arm 21 is rotated reversely in order to part the link mechanism 30 from the cartridge 10. Thereafter, the accessor is used to separate the hand mechanism temporarily from the cartridge storage rack 9. The approach of the hand mechanism must be retried repeatedly until the hand mechanism 6 is located normally relative to the cartridge storage rack 9.

On the other hand, in the present embodiment of the present invention, the crank arm 21 is coupled to the rotary base 23 via the buffer mechanism 40. Therefore, when the hand mechanism enters the state shown in FIG. 7B, if the rotation of the crank arm 21 is stopped, the state becomes analogous to the state in which an external force is, as described in conjunction with FIG. 5, applied to the crank arm 21 in the direction of arrow P. Consequently, as shown in FIG. 6C and FIG. 6D, the buffer block 41 moves to displace the rotary shaft of the crank arm 21 in a direction permitting the crank arm 21 to recede from the cartridge 10 (direction indicated with arrow Q in FIG. 7C). Consequently, the virtual rotary shaft 22K of the crank arm 21 moves backward. Therefore, the crank arm 21 can keep rotating. Eventually, the crank arm 21 reaches the maximum rotational position. Thus, owing to the crank arm 21 of the crank mechanism 20, the link mechanism 30 works normally. The cartridge 10 can be returned accurately to the cartridge storage rack 9 using the fingers 3. The present invention obviates the necessity of a retry.

Figure 7C:
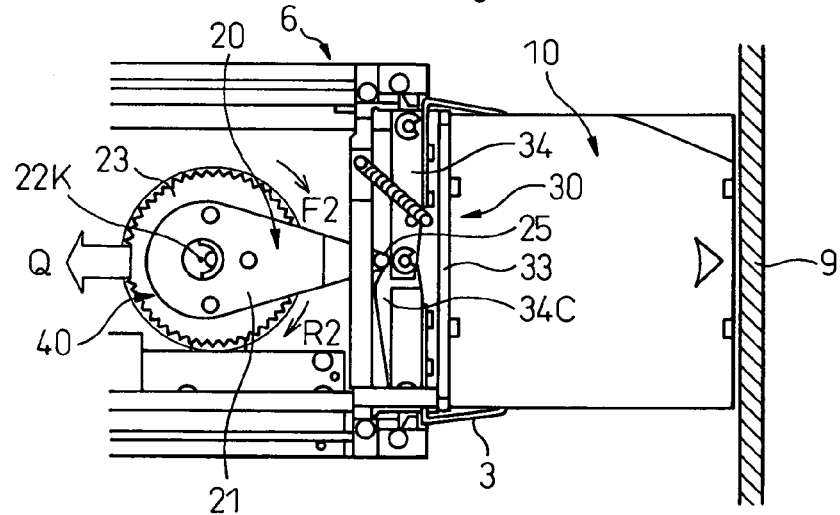
FIG. 7C shows a movement made by the hand mechanism in accordance with the present invention at the position shown in FIG. 7B.

Specifically, as shown in FIG. 7C, after the hand mechanism 6 returns the cartridge 10 to the cartridge storage rack 9, when the rotary base 23 rotates in the direction of arrow R2, the crank arm 21 rotates in the direction of arrow R2. Moreover, the buffer mechanism 40 returns to the normal position. The rotation of the crank arm 21 in the direction of arrow R2 causes the roller 25 to overpass the cam portion 34C of the link rod 34. Consequently, the fingers 3 open to leave the cartridge 10 in the cartridge storage rack 9. The link mechanism 30 then sinks into the hand mechanism 6. According to the construction of the present embodiment, even if the hand mechanism 6 approaches the cartridge storage rack 9 too closely, the cartridge 10 held by the hand mechanism 6 can be returned normally to the cartridge storage rack 9. Needless to say, the buffer mechanism 40 works in the same manner even in a case where the hand mechanism 6 fetches the cartridge 10 from the cartridge storage rack 9.

Figure 8:
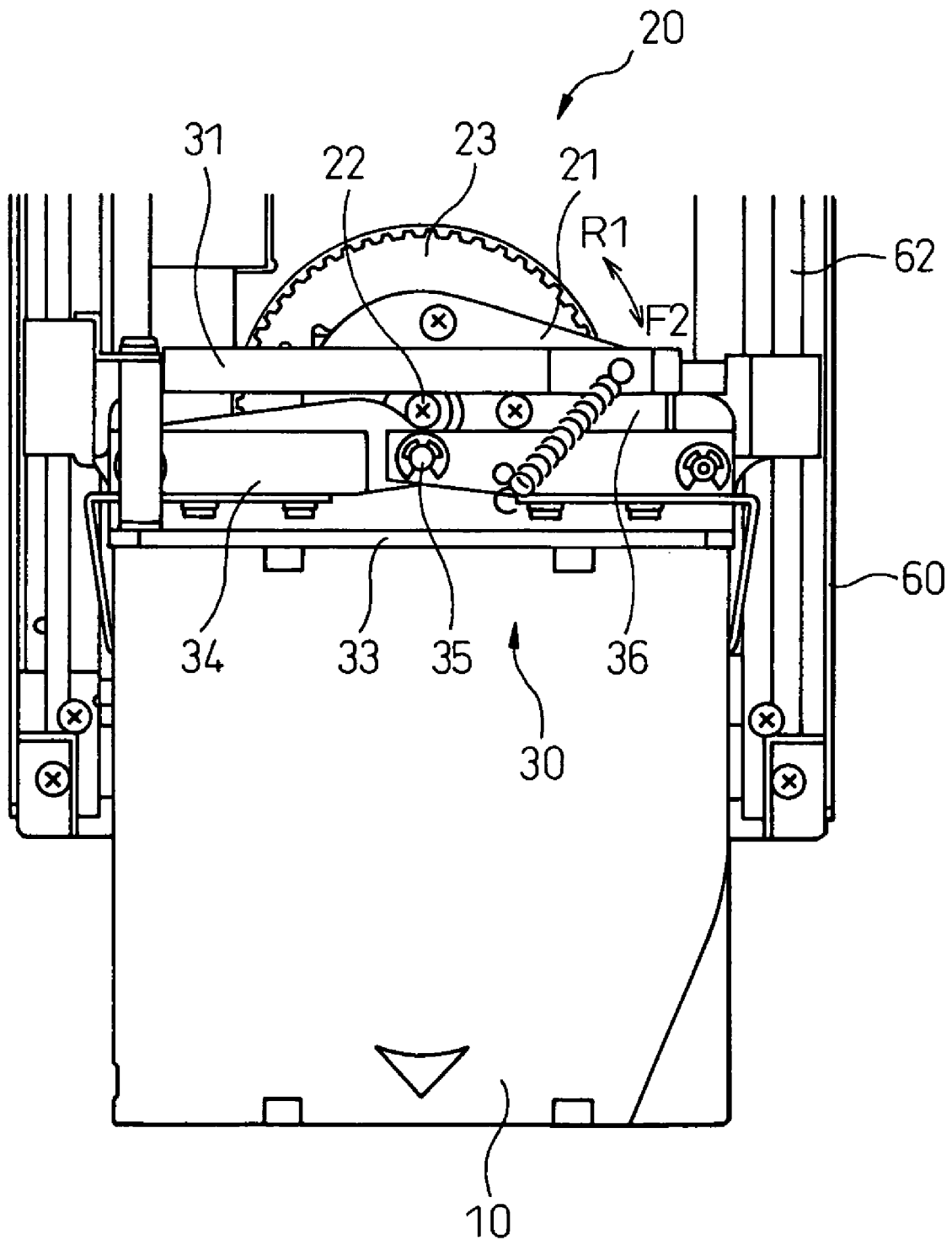
FIG. 8 shows a movement made by the hand mechanism in accordance with the present invention in order to fetch a cartridge.

FIG. 8 shows a state in which the hand mechanism that is returning the cartridge held by the fingers 3 to the cartridge storage rack 9 has not yet reached the position shown in FIG. 7A (at this time, the rotary base 23 is rotating in the direction of arrow F2) or a state in which the cartridge 10 held by the fingers 3 is sunk into the hand mechanism 6 (at this time, the rotary base 23 is rotating in the direction of arrow R1).

Figure 9A:
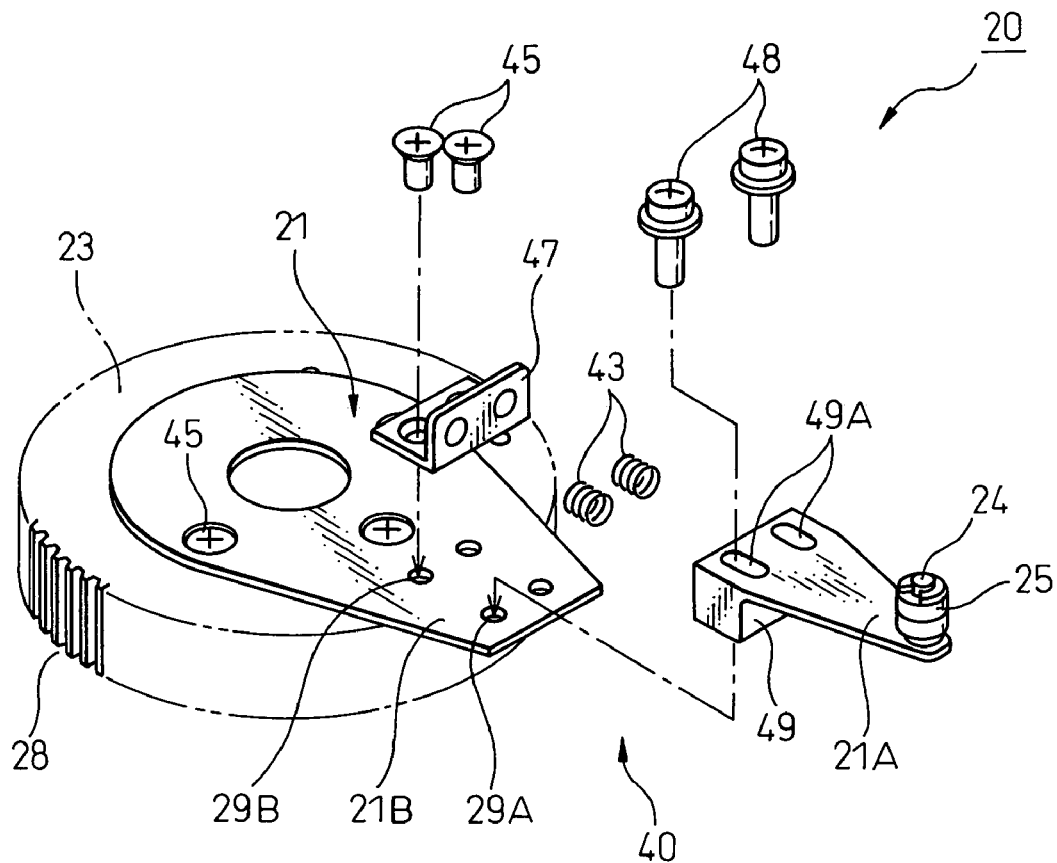
FIG. 9A is a perspective assembling diagram showing the construction of another example of a buffer mechanism incorporated in the crank mechanism included in the hand mechanism included in the library apparatus in accordance with the present invention.

FIG. 9A shows another example of the buffer mechanism 40 incorporated in the crank mechanism 20 included in the hand mechanism 6 included in the library apparatus 1 in accordance with the present invention. The buffer mechanism 40 of this example is formed in the distal part of the crank arm 21. The crank arm 21 is divided into a distal part 21A and a proximal part 21B at a position equivalent to the position of the step 21C shown in FIG. 5. The rotary base 23 is solid and has the gear 28 cut on the periphery thereof. The proximal part 21B of the crank arm is fixed to the rotary base 23 using the screws 45. The crank pin 24 and roller 25 are located at the tip of the distal part 21A of the crank arm. A slider 49 having a predetermined thickness is formed at the proximal end of the distal part 21A. The slider 49 has two oblong slide holes 49A formed parallel to the axial direction of the crank arm 21.

Screw holes 29A and 29B are bored at the free end of the proximal part 21B of the crank arm. Pins 48 passing through the slide holes 49A formed in the distal part 21A of the crank arm are inserted into the screw holes 29A. Owing to the pins 48 and slide holes 49A, the distal part 21A of the crank arm can slide in the axial direction of the crank arm 21 at the distal end of the proximal part 21B of the crank arm. A bracket 47 is secured on the proximal part 21B of the crank arm with compression springs 43 between the bracket and the slider 49 by inserting screws 45 into the screw holes 29B.

Figure 9B:
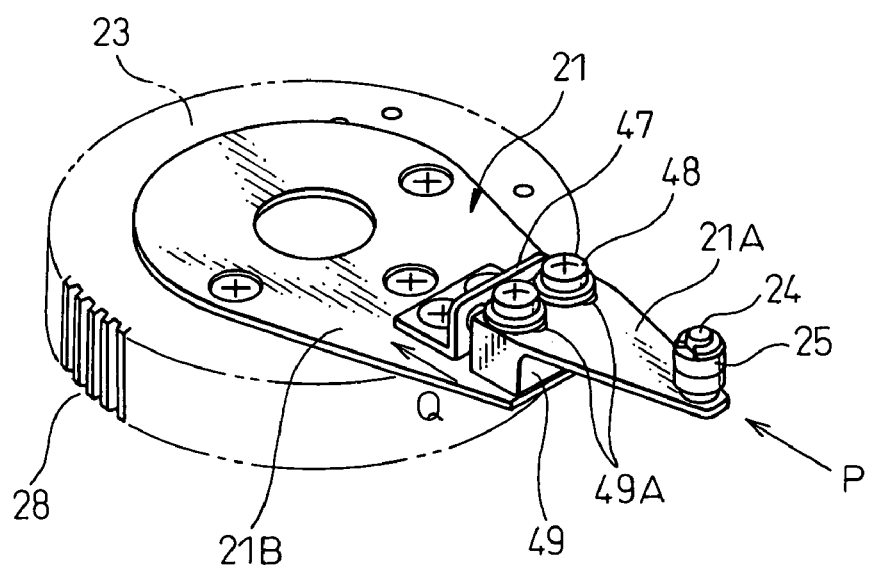
FIG. 9B is a perspective view showing the buffer mechanism having the components thereof, which are shown in FIG. 9A, assembled.

FIG. 9B shows a state in which the crank arm has the components thereof shown in FIG. 9A assembled. The distal part 21A of the crank arm is allowed to recede from the bracket 47 by the compression springs 43. Consequently, when the distal part 21A of the crank arm receives external force exerted in the direction of arrow P, the slider 49 moves in the direction of arrow Q.

When the hand mechanism enters the state shown in FIG. 7B, if the rotation of the crank arm 21 is stopped, the slider 49 included in the buffer mechanism 40 of this example is displaced in the direction of arrow Q in FIG. 9B. Consequently, the crank arm 21 can keep rotating and reach the maximum rotational position. Consequently, the crank arm 21 of the crank mechanism 20 permits the link mechanism 30 to work normally. The fingers 3 can accurately hold or release the cartridge 10. Even the hand mechanism including the buffer mechanism of this example obviates the necessity of retrial.

Figure 10A:
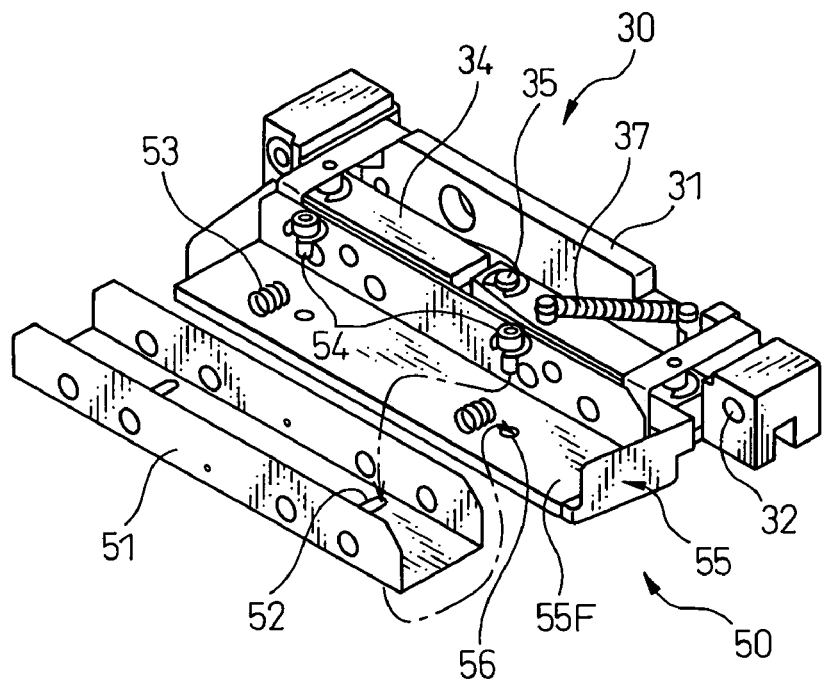
FIG. 10A is a perspective assembling diagram showing the construction of an example of a buffer mechanism incorporated in the link mechanism included in the hand mechanism included in the library apparatus in accordance with the present invention.

FIG. 10A shows the construction of an example of a buffer mechanism, that is, a buffer mechanism 50 incorporated in the link mechanism 30 included in the hand mechanism 6 included in the library apparatus 1 in accordance with the present invention. The buffer mechanism 50 of this example is formed at the position of the abutment plate 33 included in the link mechanism 30 described in conjunction with FIG. 3. A slide base 55 is attached to the position of the abutment plate 33. The slide base 55 includes a floor surface 55F having a predetermined length, and two screw holes 56 are bored in the floor surface 55F. A slide block 51 slides over the floor surface 55F, and two oblong slide holes 52 are formed at positions, which correspond to the positions of the screw holes 56, in the bottom of the slide block 51.

Figure 10B:
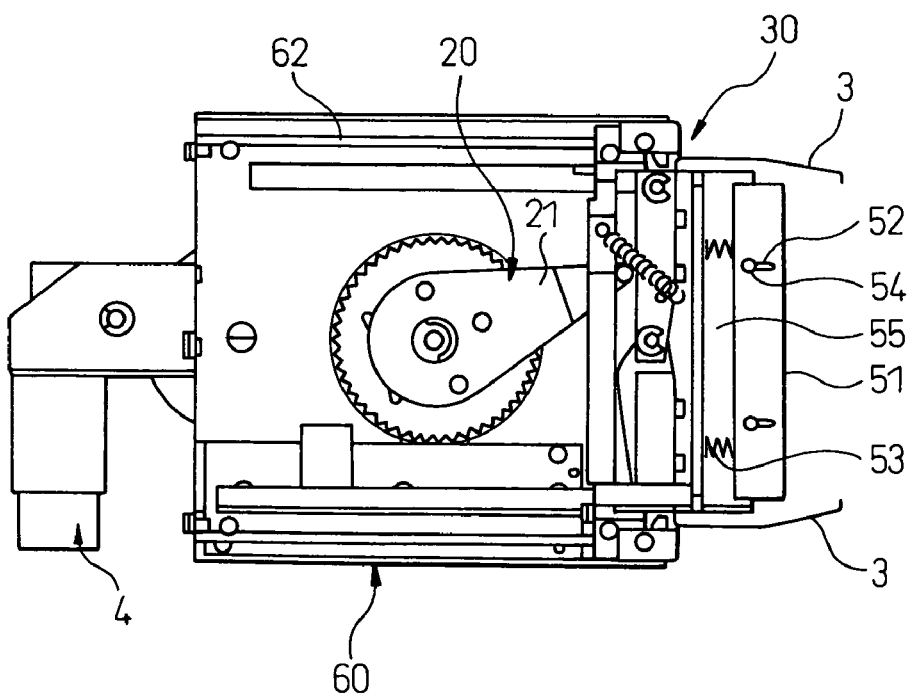
FIG. 10B is a perspective view showing the buffer mechanism having the components thereof, which are shown in FIG. 10A, assembled.

In order to mount the slide block 51 on the slide base 55, the slide block 51 is placed on the slide base 55 with compression springs 53 between them. Pins 54 are inserted into the screw holes 56 after passed through the slide holes 52 of the slide block 51. The resultant state is shown in FIG. 10B. The fingers 3 are made longer by a length by which the abutment plate 33 is extended due to the inclusion of the slide base 55 and slide block 51.

When the hand mechanism enters the state shown in FIG. 7B, if the rotation of the crank arm 21 is stopped, the slide base 55 included in the buffer mechanism 50 of this example compresses the compression springs 53 and moves towards the slide block 51. Consequently, the crank arm 21 can keep rotating and reach the maximum rotational position. Thus, the crank arm 21 included in the crank mechanism 20 permits the link mechanism 30 to work normally. The fingers 3 can accurately hold or release the cartridge 10. Even the hand mechanism including the buffer mechanism of this example obviates the necessity of a retry.

What is claimed is:

1. A library apparatus comprising:
   a plurality of cartridges each containing a recording medium;
   a storage rack in which the plurality of cartridges are stored;
   at least one drive that records or reproduces data in or from the cartridges; and
   an accessor that holds the cartridges and transports the cartridges between the storage rack and the drive, the accessor comprising:
      a hand mechanism that advances, holds or releases the cartridges, or withdraws, the hand mechanism including:
         a buffer mechanism that, even when the advancement is stopped with the hand mechanism abutted against one of said cartridges within a predetermined range before reaching a normal position, allows the hand mechanism to hold the cartridge, the buffer mechanism including a moving mechanism having a sliding portion that is pressed by compression springs, and
         the sliding portion being movable to compress the springs in accordance with an external force due to advancement being stopped by the hand mechanism abutted against one of said cartridges to allow the hand mechanism to hold the cartridge.

2. The library apparatus according to claim 1, wherein:
   the hand mechanism comprises fingers that hold the cartridge, a link mechanism that causes the fingers to hold the cartridge, and a crank mechanism that reciprocates the fingers and the link mechanism and drives the link mechanism; and
   the buffer mechanism is incorporated in the crank mechanism.

3. The library apparatus according to claim 2, wherein:
   a rotary shaft of a crank arm included in the crank mechanism is driven to rotate by a rotary base accommodating the rotary shaft; and
   the buffer mechanism is interposed between the rotary shaft and the rotary base.

4. The library apparatus according to claim 3, wherein:
   the moving mechanism is a buffer block coupled to the rotary shaft, and
   the buffer mechanism comprises:
      the buffer block,
      slide shafts that allow the buffer block to move in an inner space of the rotary base, and
      compression springs wound about the slide shafts,
   the rotary shaft is located in a center of the rotary base in a normal state owing to constraining force exerted by the compression springs, and
   if the advancement of the hand mechanism is stopped with the hand mechanism abutted against the cartridge within the predetermined range before reaching the normal position, the rotary shaft moves in a direction opposite to a direction of the crank arm, due to contraction of the compression springs, so that the crank arm will keep rotating and the link mechanism will be driven normally.

5. The library apparatus according to claim 4, wherein:
   the link mechanism comprises two link rods;
   one end of each of the two link rods is supported by the bottom of a housing of the hand mechanism so that the link rod can freely pivot, and the other end of each of the two link rods is joined by a pin so that the link rods can freely pivot;
   the fingers are attached outside the supported ends of the two link rods;
   the link rods are constrained to move in a direction, which permits the fingers to close, by a tension spring; and
   when the crank arm rotates and the hand mechanism reaches the normal position, the two link rods of the link mechanism are pressed by the crank pin included in the crank arm so that the fingers will open.

6. The library apparatus according to claim 2, wherein:
   a crank arm of the crank mechanism includes a proximal part coupled to the rotary shaft and a distal part having a crank pin, and
   the moving mechanism of the buffer mechanism being provided between the distal part and the proximal part of the crank arm,
   and the moving mechanism moving the distal part toward the proximal part in accordance with an external force due to the advancement being stopped by the hand mechanism abutted against the cartridge.

7. The library apparatus according to claim 6, wherein:
   the moving mechanism comprises a stationary bracket that is mounted on the crank arm, a slide member movable in an axial direction of the crank arm over the crank arm with slide pins inserted therein, and compression springs interposed between the stationary bracket and the slide member in order to allow the slide member to move toward the distal end of the crank arm; and
   if the advancement of the hand mechanism is stopped with the hand mechanism abutted against the cartridge within the predetermined range before reaching the normal position, the slide member moves toward the stationary bracket due to contraction of the compression springs so that the crank arm will keep rotating and the hand mechanism will reach the normal position.

8. The library apparatus according to claim 7, wherein:
   the link mechanism comprises two link rods;
   one end of each of the two link rods is supported by the bottom of a housing of the hand mechanism so that the link rod can freely pivot, and the other end of each of the two link rods is joined by a pin so that the link rods can freely pivot;
   the fingers are attached outside the supported ends of the two link rods;
   the link rods are constrained to move in a direction, which permits the fingers to close, by means of a tension spring; and
   when the crank arm rotates and the hand mechanism reaches the normal position, the two link rods of the link mechanism are pressed by the crank pin included in the crank arm so that the fingers will open.

9. The library apparatus according to claim 1, wherein:
   the hand mechanism comprises two fingers that hold the cartridge while clamping both sides of the cartridge, a link mechanism that causes the fingers to hold the cartridge, and a crank mechanism that reciprocates the fingers and the link mechanism; and the buffer mechanism is located at the position of a cartridge abutment member linking the fingers.

10. The library apparatus according to claim 9, wherein:

the abutment member comprises a stationary plate located in the link mechanism, and an abutment plate attached to the stationary plate with compression springs between them so that it can move toward the stationary plate; and if the advancement of the hand mechanism is stopped with the hand mechanism abutted against the cartridge within the predetermined range before reaching the normal position, the abutment plate moves toward the stationary plate due to contraction of the compression springs so that the crank arm will keep rotating and the hand mechanism will reach the normal position.

11. The library apparatus according to claim 10, wherein:

the link mechanism comprises two link rods;

one end of each of the two link rods is supported by the bottom of a housing of the hand mechanism so that the link rod can freely pivot, and the other end of each of the two link rods is joined by a pin so that the link rods can freely pivot;

the fingers are attached outside the supported ends of the two link rods;

the link rods are constrained to move in a direction, which permits the fingers to close, by means of a tension spring; and when the crank arm rotates and the hand mechanism reaches the normal position, the two link rods of the link mechanism are pressed by the crank pin included in the crank arm so that the fingers will open.

12. A hand mechanism included in an accessor of a library apparatus comprising a plurality of cartridges each containing a recording medium, a storage rack in which the plurality of cartridges is stored, at least one drive that records or reproduces data in or from the cartridge, and an accessor that holds the cartridge and transports the cartridge between the storage rack and the drive, the hand mechanism comprising:

fingers that can hold the cartridge;

a link mechanism that causes the fingers to hold the cartridge; and a crank mechanism that rotates to reciprocate the fingers and the link mechanism and to drive the link mechanism, the crank mechanism comprising:

a buffer mechanism that even if the rotation of the crank mechanism is stopped halfway with the hand mechanism abutted against the cartridge, allows the crank mechanism to keep rotating, the buffer mechanism being equipped with a moving mechanism having a sliding portion that is pressed by compression springs, the sliding portion to compress the springs in accordance with an external force due to the rotation being stopped by the hand mechanism abutted against one of said cartridges to allow the hand mechanism to hold the cartridge.

13. The hand mechanism according to claim 12, wherein:

a rotary shaft of a crank arm included in the crank mechanism is driven to rotate by a rotary base accommodating the rotary shaft; and the buffer mechanism is interposed between the rotary shaft and the rotary base.

14. The hand mechanism according to claim 13, wherein:

the buffer mechanism comprises a buffer block coupled to the rotary shaft, slide shafts allowing the buffer block to move within the rotary base, and compression springs wound about the slide shafts;

the rotary shaft is located in a center of the rotary base in a normal state owing to constraining force exerted by the compression springs; and if the advancement of the hand mechanism is stopped with the hand mechanism abutted against the cartridge within a predetermined range before reaching a normal position, the rotary shaft moves in a direction opposite to the direction of the crank arm due to contraction of the compression springs so that the crank arm will keep rotating and the link mechanism will be driven normally.

15. The hand mechanism according to claim 14, wherein:

the link mechanism comprises two link rods;

one end of each of the two link rods is supported by the bottom of a housing of the hand mechanism so that the link rod can freely pivot, and the other end of each of the two links rods is joined by a pin so that the link rod can freely pivot;

the fingers are attached outside the supported ends of the two link rods;

the link rods are constrained to move in a direction, which permits the fingers to open, by means of a tension spring;

when the crank arm rotates and the hand mechanism reaches the normal position, the two link rods of the link mechanism are pressed by the crank pin included in the crank arm so that the fingers will open.

16. The hand mechanism according to claim 12, wherein:

the crank mechanism includes a crank arm and a crank pin; and the buffer mechanism is realized with a moving mechanism that moves the crank pin, which is located at the distal end of the crank arm, toward the rotary shaft of the crank arm.

17. The hand mechanism according to claim 16, wherein:

the moving mechanism comprises a stationary bracket that is mounted on the crank arm, a slide member movable in an axial direction of the crank arm over the crank arm with slide pins inserted therein, and compression springs interposed between the stationary bracket and the slide member in order to constrain the slide member to move toward the distal end of the crank arm; and if the advancement of the hand mechanism is stopped with the hand mechanism abutted against the cartridge within the predetermined range before reaching a normal position, the slide member moves toward the stationary bracket due to contraction of the compression springs so that the crank arm will keep rotating and the hand mechanism will reach the normal position.

18. The hand mechanism according to claim 12, wherein;

the hand mechanism comprises two fingers that hold the cartridge, a link mechanism that causes the fingers to hold the cartridge, and a crank mechanism that reciprocates the fingers and the link mechanism; and the buffer mechanism is located at the position of a cartridge abutment member linking the fingers.

19. The hand mechanism according to claim 18, wherein:

the abutment member comprises a stationary plate located in the link mechanism, and an abutment plate attached to the stationary plate with compression springs between them so that it can move; and if the advancement of the hand mechanism is stopped with the hand mechanism abutted against the cartridge within a predetermined range before reaching a normal position, the abutment plate moves toward the stationary plate due to contraction of the compression springs so that the crank arm will keep rotating and the hand mechanism will reach the normal position.

20. The hand mechanism according to claim 19, wherein:
the link mechanism comprises two link rods;
one end of each of the two link rods is supported by the bottom of a housing of the hand mechanism so that the link rod can freely pivot, and the other end of each of the two links rods is joined by a pin so that the link rod can freely pivot;
the fingers are attached outside the supported ends of the two link rods;
the link rods are constrained to move in a direction, which permits the fingers to open, by means of a tension spring;
when the crank arm rotates and the hand mechanism reaches the normal position, the two link rods of the link mechanism are pressed by the crank pin included in the crank arm so that the fingers will open.

21. The hand mechanism according to claim 12, wherein:
the link mechanism comprises two link rods;
one end of each of the two link rods is supported by the bottom of a housing of the hand mechanism so that the link rod can freely pivot, and the other end of each of the two links rods is joined by a pin so that the link rod can freely pivot;
the fingers are attached outside the supported ends of the two link rods;
the link rods are constrained to move in a direction, which permits the fingers to open, by means of a tension spring;
when the crank arm rotates and the hand mechanism reaches the normal position, the two link rods of the link mechanism are pressed by the crank pin included in the crank arm so that the fingers will open.

22. A library apparatus comprising:
a plurality of cartridges each containing a recording medium;
a storage rack in which the plurality of cartridges are stored;
a drive that records or reproduces data in or from the cartridges; and
an accessor that holds the cartridges and transports the cartridges between the storage rack and the drive, the accessor comprising:
a hand mechanism that advances, holds or releases the cartridges, or withdraws, including a buffer mechanism that, even when an advancement is stopped with the hand mechanism abutted against one of said cartridges within a predetermined range before reaching a normal position, allows the hand mechanism to hold the cartridge, the hand mechanism comprising:
fingers that can hold the cartridge,
a link mechanism that causes the fingers to hold the cartridge, and
a crank mechanism that reciprocates the fingers and the link mechanism, drives the link mechanism, and incorporates the buffer mechanism, the crank mechanism including a crank arm having a proximal part coupled to the rotary shaft and a distal part having a crank pin, and a moving mechanism of the buffer mechanism provided between the distal part and the proximal part of the crank arm.

23. A hand mechanism included in an accessor of a library apparatus comprising a plurality of cartridges each containing a recording medium, a storage rack in which the plurality of cartridges are stored, a drive that records or reproduces data in or from the cartridges, and an accessor that holds the cartridges and transports the cartridges between the storage rack and the drive, the hand mechanism comprising:
fingers that can hold one of said cartridges;
a link mechanism that causes the fingers to hold the cartridge; and
a crank mechanism that rotates to reciprocate the fingers and the link mechanism and to drive the link mechanism, the crank mechanism comprising:
a buffer mechanism that even if a rotation of a crank mechanism is stopped halfway with the hand mechanism abutted against the cartridge, allows the crank mechanism to keep rotating,
the link mechanism comprising two link rods, one end of each of the two link rods being supported by a bottom of a housing of the hand mechanism so that the link rod can freely pivot, and another end of each of the two links rods being joined by a pin so that the link rod can freely pivot,
the fingers being attached outside the supported ends of the two link rods,
the link rods are constrained to move in a direction, which permits the fingers to open, by a tension spring, and
upon the crank arm rotating and the hand mechanism reaching a normal position, the two link rods being pressed by a crank pin included in the crank arm and opening the fingers.

* * * * *

UNITED STATES PATENT AND TRADEMARK OFFICE
CERTIFICATE OF CORRECTION

PATENT NO. : 7,466,511 B2
APPLICATION NO. : 11/175227
DATED : December 16, 2008
INVENTOR(S) : Kazunori Ishiyama It is certified that error appears in the above-identified patent and that said Letters Patent is hereby corrected as shown below:

Column 16, Line 28, change "a crank" to --the crank--.

Signed and Sealed this

Seventeenth Day of March, 2009

JOHN DOLL
*Acting Director of the United States Patent and Trademark Office*